United States Patent
Hidaka

(10) Patent No.: US 9,850,339 B2
(45) Date of Patent: Dec. 26, 2017

(54) LIQUID CRYSTALLINE POLYURETHANE ELASTOMER AND METHOD FOR PRODUCING SAME

(71) Applicant: TOYO TIRE & RUBBER CO., LTD., Osaka-shi, Osaka (JP)

(72) Inventor: Yuki Hidaka, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 0 days.

(21) Appl. No.: 15/103,005

(22) PCT Filed: Aug. 22, 2014

(86) PCT No.: PCT/JP2014/072032
§ 371 (c)(1),
(2) Date: Jun. 9, 2016

(87) PCT Pub. No.: WO2015/093099
PCT Pub. Date: Jun. 25, 2015

(65) Prior Publication Data
US 2016/0376396 A1    Dec. 29, 2016

(30) Foreign Application Priority Data

Dec. 18, 2013  (JP) .................................. 2013-260911
Dec. 18, 2013  (JP) .................................. 2013-260912

(51) Int. Cl.
| | |
|---|---|
| C08G 18/10 | (2006.01) |
| C09K 19/38 | (2006.01) |
| C08G 18/32 | (2006.01) |
| C08G 18/48 | (2006.01) |
| C08G 18/76 | (2006.01) |

(52) U.S. Cl.
CPC ......... *C08G 18/10* (2013.01); *C08G 18/3206* (2013.01); *C08G 18/3215* (2013.01); *C08G 18/4812* (2013.01); *C08G 18/4825* (2013.01); *C08G 18/4829* (2013.01); *C08G 18/7621* (2013.01); *C09K 19/3885* (2013.01)

(58) Field of Classification Search
CPC C09K 19/3885; C08G 18/10; C08G 18/3206; C08G 18/3215; C08G 18/4812; C08G 18/4829; C08G 18/4825; C08G 18/7621
See application file for complete search history.

(56) References Cited

U.S. PATENT DOCUMENTS

| | | |
|---|---|---|
| 4,791,187 A | 12/1988 | Suling et al. |
| 5,395,910 A | 3/1995 | De Wit et al. |
| 5,641,854 A * | 6/1997 | Jones .................. C08G 18/8077 428/480 |

FOREIGN PATENT DOCUMENTS

| | | |
|---|---|---|
| EP | 0256470 A2 | 2/1988 |
| JP | 4-161423 A | 6/1992 |
| JP | 5-170860 A | 7/1993 |
| JP | 5-247168 A | 9/1993 |
| JP | 1-258369 A | 10/1995 |
| JP | 3103638 B2 | 8/2000 |
| JP | 2005-194427 A | 7/2005 |

OTHER PUBLICATIONS

Notification of Transmittal Translation of the International Preliminary Report on Patentability (Forms PCT/IB/338) issued in counterpart International Application No. PCT/JP2014/072032 dated Jun. 30, 2016 with Forms PCT/IB/373 and PCT/ISA/237. (6 pages).
International Search Report dated Oct. 7, 2014, issued in counterpart International application No. PCT/JP2014/072032(2pages).
Extended (supplementary) European Search Report dated Nov. 21, 2016, issued in counterpart European Application No. 14872013.9. (6 pages).

* cited by examiner

*Primary Examiner* — Rabon Sergent
(74) *Attorney, Agent, or Firm* — Westerman, Hattori, Daniels & Adrian, LLP

(57) ABSTRACT

A liquid crystalline polyurethane elastomer is produced by reacting an isocyanate component, a high-molecular-weight polyol component and a mesogenic diol represented by formula (1), and having a crosslinking site that is introduced by a tri-functional or higher isocyanate in the isocyanate component and/or a high-molecular-weight polyol having a number average molecular weight of 400 or more and less than 7000 and having three or more hydroxy groups, in the high-molecular-weight polyol component, wherein the melting point of a mesogenic unit does not exist in a temperature range lying between the glass transition temperature (Tg) and the (liquid crystal phase)-to-(isotropic phase) transition temperature (Ti) of the polyurethane elastomer, and a liquid crystal is developed at a temperature between the Tg and the Ti. (In the formula, X represents an alkylene group having 3 to 20 carbon atoms; and Y represents a single bond, —N=N—, —CO—, —CO—O— or —CH=N—).

[Formula]

(1)

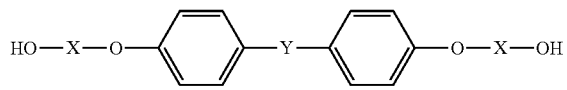

11 Claims, No Drawings

LIQUID CRYSTALLINE POLYURETHANE ELASTOMER AND METHOD FOR PRODUCING SAME

TECHNICAL FIELD

The present invention relates to a thermotropic type of a liquid crystalline polyurethane elastomer, and a method for producing the same.

BACKGROUND ART

A liquid crystal elastomer is a hybrid material of liquid crystals and elastomers. The liquid crystal elastomer shows a characteristic response behavior in such a manner that the liquid crystal elastomer is extended in the orientation direction by applying an external stimulus such as heat, light, electric field, and magnetic field to increase the degree of liquid crystal orientation, but the liquid crystal elastomer is shrunk by removing such a stimulus to decrease the degree of liquid crystal orientation. Thus, applications of such an elastomer to various fields such as actuators and the like have been attempted.

For example, Patent Document 1 discloses a thermotropic liquid crystal polyurethane obtained by reacting a bis(ω-hydroxyalkyleneoxy)biphenyl and 1,4-phenylene diisocyanate.

Further, Patent Document 2 discloses a polymer liquid crystal polyurethane obtained by polymerizing a diol component having a mesogenic group with a trans-1,4-cyclohexane diisocyanate.

However, in the conventional liquid crystal polyurethane, the temperature at which a liquid crystal is developed is very high and it was difficult to develop liquid crystallinity at a low temperature (near room temperature). Further, the conventional liquid crystal polyurethane did not exhibit rubbery elasticity due to increased fluidity when a liquid crystal is developed therein.

PRIOR ART DOCUMENTS

Patent Documents

Patent Document 1: JP-A-H5-170860
Patent Document 2: JP-A-H7-258369

SUMMARY OF THE INVENTION

Problems to be Solved by the Invention

An object of the present invention is to provide a liquid crystalline polyurethane elastomer having a low liquid crystal-developing temperature and can exhibit rubbery elasticity when a liquid crystal is developed therein, and a method for producing the liquid crystalline polyurethane elastomer.

Means for Solving the Problems

As a result of intensive and repeated studies to solve the above problems, the present inventors have found that the above object can be achieved by the liquid crystalline polyurethane elastomer described below, and have completed the present invention.

The present invention relates to a liquid crystalline polyurethane elastomer, which is produced by reacting at least an isocyanate component, a high-molecular-weight polyol component and a mesogenic diol represented by general formula (1) with one another, and has a crosslinking site that is introduced by a tri-functional or higher isocyanate in the isocyanate component and/or a high-molecular-weight polyol having a number average molecular weight of 400 or more and less than 7000 and having three or more hydroxy groups, in the high-molecular-weight polyol component, wherein the melting point of a mesogenic unit does not exist in a temperature range lying between the glass transition temperature (Tg) and the (liquid crystal phase)-to-(isotropic phase) transition temperature (Ti) of the polyurethane elastomer, and a liquid crystal is developed at a temperature between the Tg and the Ti.

[Formula]

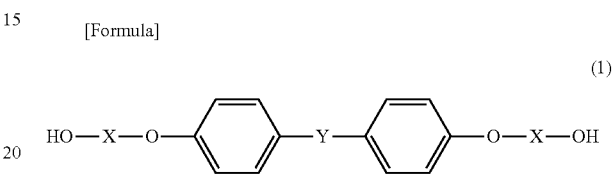

(1)

(In the formula, X represents an alkylene group having 3 to 20 carbon atoms; and Y represents a single bond, —N=N—, —CO—, —CO—O— or —CH=N—.)

The present inventors have found that a liquid crystalline polyurethane elastomer obtained by forming a network through introduction of a crosslinking site into the liquid crystalline polyurethane elastomer with use of a tri-functional or higher isocyanate and/or a high-molecular-weight polyol having a number average molecular weight of 400 or more and less than 7000 and having three or more hydroxy groups does not melt even if a liquid crystal is developed therein, but keeps the solid form and exhibits rubbery elasticity.

Further, a typical liquid crystal polymer has a (liquid crystal phase)-to-(isotropic phase) transition temperature (Ti) in a higher temperature range than the melting point (Tm) of a mesogenic unit, and a liquid crystal is developed at a temperature between the Tm and the Ti. The present inventor has found that the liquid crystalline polyurethane elastomer which does not have a melting point of a mesogenic unit between the Tg and the Ti and develops the liquid crystal at a temperature between the Tg and the Ti is obtained by inhibiting the crystallinity of a mesogen (a functional group capable of developing liquid crystallinity) to prevent the formation of a crystalline phase due to the network structure of the crosslinks.

Further, when only a mesogenic diol represented by the above general formula (1) is used as the mesogenic diol, there is obtained a liquid crystalline polyurethane elastomer, wherein no phase transition from a crystalline phase to a liquid crystal phase exists, but only a glass transition and a phase transition from a liquid crystal phase to an isotropic phase exist. Moreover, since a high-molecular-weight polyol component is used in addition to the mesogenic diol, the temperature at which a liquid crystal is developed is low, and yet the crystallinity of a mesogenic unit is highly inhibited by an appropriate polymer network structure. In addition, depending on the type of the functional group introduced between the two phenyl groups of the mesogenic diol, the crystallinity of a mesogenic unit is more highly inhibited by such a functional group, thereby making it possible to develop a liquid crystal in a wider temperature range.

Since the liquid crystalline polyurethane elastomer of the present invention uses a high-molecular-weight polyol component in addition to the mesogenic diol, the temperature at which a liquid crystal is developed is low and yet the flexibility due to the polymer network structure has been imparted, so that the liquid crystalline polyurethane elastomer exhibits rubbery elasticity when a liquid crystal is developed therein.

In the case where the number average molecular weight of the high-molecular-weight polyol having three or more hydroxyl groups is less than 400, flexibility by the polymer network structure is not imparted to the liquid crystalline polyurethane elastomer, so that rubbery elasticity cannot be obtained when a liquid crystal is developed. On the other hand, if the number average molecular weight of the high-molecular-weight polyol is 7000 or more, a liquid crystal is not developed therein because the content of a mesogen is relatively reduced.

When using a mesogenic diol wherein Y is a single bond, —N═N— or —CO—, it is preferable that the glass transition temperature (Tg) of the liquid crystalline polyurethane elastomer is −50 to 30° C. and the (liquid crystal phase)-to-(isotropic phase) transition temperature (Ti) is 35 to 85° C.

Further, in that case, the blending amount of the mesogenic diol to the total material components is preferably 10 to 50 wt %, and the molecular weight between crosslinks is preferably 1500 to 20000.

If the blending amount of the mesogenic diol is less than 10 wt %, a liquid crystal is hardly developed. On the other hand, if the blending amount of the mesogenic diol exceeds 50 wt %, the melting point (Tm) of a mesogenic unit tends to occur at a temperature of between the Tg and the Ti, and the liquid crystal is hardly developed at a low temperature.

When the molecular weight between crosslinks is less than 1500, the rubbery elasticity is less likely to occur when a liquid crystal is developed. On the other hand, in the case where the molecular weight between crosslinks is more than 20000, it is difficult to obtain the liquid crystalline polyurethane elastomer because of difficulty in curing.

When using a mesogenic diol wherein Y is —CO—O—, it is preferable that the glass transition temperature (Tg) of the liquid crystalline polyurethane elastomer is −60° C. or higher and less than 30° C. and the (liquid crystal phase)-to-(isotropic phase) transition temperature (Ti) is 30 to 130° C.

Further, in that case, the blending amount of the mesogenic diol to the total material components is preferably 30 to 80 wt %, and the molecular weight between crosslinks is preferably 2500 to 25000.

If the blending amount of the mesogenic diol is less than 30 wt %, a liquid crystal is hardly developed. On the other hand, when the blending amount of the mesogenic diol exceeds 80 wt %, it is difficult to obtain a liquid crystalline polyurethane elastomer of interest because of difficulty in introducing a crosslinking site in the molecule.

When the molecular weight between crosslinks is less than 2500, a liquid crystal is difficult to develop due to the excess crosslinking sites in the molecule, or the rubbery elasticity is less likely to occur when a liquid crystal is developed. On the other hand, in the case where the molecular weight between crosslinks is more than 25000, it is difficult to obtain a liquid crystalline polyurethane elastomer because of difficulty in curing.

When using a mesogenic diol wherein Y is —CH═N—, it is preferable that the glass transition temperature (Tg) of the liquid crystalline polyurethane elastomer is −50 to 30° C. and the (liquid crystal phase)-to-(isotropic phase) transition temperature (Ti) is 35 to 120° C.

Further, in that case, the blending amount of the mesogenic diol to the total material components is preferably 15 to 70 wt %, and the molecular weight between crosslinks is preferably 1500 to 25000.

If the blending amount of the mesogenic diol is less than 15 wt %, a liquid crystal is hardly developed. On the other hand, if the blending amount of the mesogenic diol exceeds 70 wt %, the melting point (Tm) of a mesogenic unit tends to occur at a temperature of between the Tg and the Ti, and the liquid crystal is hardly developed at a low temperature.

When the molecular weight between crosslinks is less than 1500, the rubbery elasticity is less likely to occur when a liquid crystal is developed. On the other hand, in the case where the molecular weight between crosslinks is more than 25000, it is difficult to obtain the liquid crystalline polyurethane elastomer because of difficulty in curing.

Further, the present invention relates to a method for producing the liquid crystalline polyurethane elastomer, which method comprises reacting at least an isocyanate component and a high-molecular-weight polyol component to synthesize an isocyanate-terminated prepolymer and reacting the resulting isocyanate-terminated prepolymer with a mesogenic diol. By producing the liquid crystalline polyurethane elastomer with use of the method concerned, it becomes easy to form a crosslinked structure.

Effect of the Invention

The liquid crystalline polyurethane elastomer of the present invention has a lower liquid crystal-developing temperature, as compared with the conventional liquid crystal polyurethane, keeps the solid form without melting when a liquid crystal is developed, and yet exhibits rubbery elasticity. Further, in the liquid crystalline polyurethane elastomers of the present invention, the melting point of a mesogenic unit does not exist in a temperature range lying between the Tg and the Ti, and a liquid crystal is developed at a temperature between the Tg and the Ti. Thus, the liquid crystalline polyurethane elastomer of the present invention is different in the liquid crystalline properties from the conventional liquid crystal polyurethane.

MODE FOR CARRYING OUT THE INVENTION

The liquid crystalline polyurethane elastomer of the present invention is obtained by reacting at least an isocyanate component, a high-molecular-weight polyol component and a mesogenic diol represented by the following general formula (1):

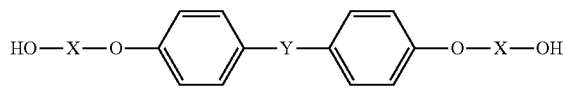

(In the formula, X represents an alkylene group having 3 to 20 carbon atoms; and Y represents a single bond, —N═N—, —CO—, —CO—O— or —CH═N—.)

As the isocyanate component, it is preferable to use a tri-functional or higher isocyanate, and particularly preferable to use a tri-functional isocyanate so as to form a network by introducing a crosslinking site into the liquid crystalline polyurethane elastomer. The tri-functional or higher isocyanates include, for example, triisocyanates (e.g., triphenylmethane triisocyanate, tris(isocyanatephenyl)thiophosphate, lysine ester triisocyanate, 1,3,6-hexamethylene triisocyanate, 1,6,11-undecane triisocyanate, 1,8-diisocyanate-4-isocyanate methyloctane, and bicycloheptane triisocyanate) and tetraisocyanates (e.g., tetraisocyanate silane). These may be used alone or in combination of two or more thereof. It may also be possible to use a polymerized diisocyanate. As used herein, the term 'polymerized diisocyanate' refers to any of polymerized isocyanate derivatives produced by addition of three or more molecules of diisocyanate, or refers to a mixture of the isocyanate derivatives. For example, the isocyanate derivative may be of (1) trimethylolpropane adduct type, (2) biuret type, (3) isocyanurate type, or the like. In particular, the isocyanurate type is preferred.

As the isocyanate component, it is preferable to use only the tri-functional or higher isocyanate, but diisocyanates may be used in combination within a range that does not impair the object of the present invention. The diisocyanates include, for example, aromatic diisocyanates such as 2,4-toluene diisocyanate, 2,6-toluene diisocyanate, 2,2'-diphenyl methane diisocyanate, 2,4'-diphenyl methane diisocyanate, 4,4'-diphenyl methane diisocyanate, 1,5-naphthalene diisocyanate, p-phenylene diisocyanate, m-phenylene diisocyanate, p-xylylene diisocyanate and m-xylylene diisocyanate, aliphatic diisocyanates such as ethylene diisocyanate, 2,2,4-trimethyl hexamethylene diisocyanate and 1,6-hexamethylene diisocyanate, and cycloaliphatic diisocyanates such as 1,4-cyclohexane diisocyanate, 4,4'-dicyclohexyl methane diisocyanate, isophorone diisocyanate and norbornane diisocyanate. These may be used alone or as a mixture of two or more thereof.

As the high-molecular-weight polyol component, it is preferable to use a high-molecular-weight polyol having a number average molecular weight of 400 or more and less than 7000 and having three or more hydroxyl groups so as to form a network by introducing a crosslinking site into the liquid crystalline polyurethane elastomer. The number average molecular weight of such a polyol component is preferably 400 to 6000, more preferably 700 to 5000. The number of hydroxyl groups is more preferably 3. The high-molecular-weight polyol includes polyether polyols, polyester polyols, polycarbonate polyols, polyester polycarbonate polyols, and the like. These polyols may be used alone or in combination of two or more thereof. Among these, it is particularly preferred to use a polyether polyol.

It is preferable to use only the high-molecular-weight polyol component having a number average molecular weight of 400 or more and less than 7000 and having three or more hydroxyl groups, but other high-molecular-weight polyols may be used in combination within a range that does not impair the object of the present invention.

In addition to the high-molecular-weight polyol component, an active hydrogen group-containing low molecular weight compound may be used within a range that does not impair the object of the present invention. The active hydrogen group-containing low molecular weight compound refers to a compound having a molecular weight of less than 400, examples thereof include a low molecular weight polyol such as ethylene glycol, 1,2-propylene glycol, 1,3-propylene glycol, 1,2-butanediol, 1,3-butanediol, 1,4-butanediol, 2,3-butanediol, 1,6-hexanediol, neopentyl glycol, 1,4-cyclohexanedimethanol, 3-methyl-1,5-pentanediol, diethylene glycol, triethyleneglycol, 1,4-bis(2-hydroxyethoxy)benzene, trimethylolpropane, glycerin, 1,2,6-hexanetriol, pentaerythritol, tetramethylolcyclohexane, methyl glucoside, sorbitol, mannitol, dulcitol, sucrose, 2,2,6,6-tetrakis(hydroxymethyl)cyclohexanol, diethanolamine, N-methyldiethanolamine, triethanolamine and the like; a low molecular weight polyamine such as ethylenediamine, tolylenediamine, diphenylmethanediamine, diethylenetriamine and the like; an alcoholamines such as monoethanolamine, 2-(2-aminoethylamino) ethanol, monopropanolamine and the like. These active hydrogen group-containing low molecular weight compound may be used alone or as a mixture of two or more thereof.

The mesogenic diol represented by the general formula (1) has a biphenyl skeleton (Y is a single bond), an azobenzene skeleton (Y is —N=N—), a benzophenone skeleton (Y is —CO—), an ester skeleton (Y is —CO—O—), or an imine skeleton (Y is —CH=N—). These may be used alone or in combination of two or more thereof. In particular, it is preferable to use those having a biphenyl skeleton, an ester skeleton, or an imine skeleton. In the formula (1), X is an alkylene group having 3 to 20 carbon atoms, preferably an alkylene group having 5 to 10 carbon atoms. Of the mesogenic diol represented by the general formula (1), it is particularly preferred to use 4,4'-bis(6-hydroxyhexyloxy) biphenyl or 4,4'-bis(6-hydroxydecane-1-oxy) biphenyl.

The blending amount of the mesogenic diol when Y is a single bond, —N=N—, or —CO— is preferably 10 to 50 wt %, more preferably 15 to 40 wt %, based on the total material components.

The blending amount of the mesogenic diol when Y is —CO—O— is preferably 30 to 80 wt %, more preferably 35 to 80 wt %, still more preferably 35 to 60 wt %, based on the total material components.

The blending amount of the mesogenic diol when Y is —CH=N— is preferably 15 to 70 wt %, more preferably 20 to 60 wt %, based on the total material components.

The liquid crystalline polyurethane elastomer of the present invention may be prepared by a prepolymer method or a one-shot method, but the liquid crystalline polyurethane elastomer is prepared preferably by the prepolymer method comprising the reaction of an isocyanate component with a high-molecular-weight polyol component to synthesize an isocyanate-terminated prepolymer, which is then allowed to react with a mesogenic diol.

In the case of using a mesogenic diol when Y is a single bond, —N=N—, or —CO—, the number of isocyanate groups of the isocyanate component is preferably 2 to 6, more preferably 2 to 4, in the synthesis of the isocyanate-terminated prepolymer, relative to the number of active hydrogen groups (such as a hydroxyl group) of an active hydrogen group-containing compound. Further, in that case, the NCO wt % is preferably adjusted to 4 to 20 wt %, more preferably 4 to 14 wt %, in the synthesis of an isocyanate-terminated prepolymer.

In the case of using a mesogenic diol when Y is —CO—O—, the number of isocyanate groups of the isocyanate component is preferably 2 to 10, more preferably 2 to 8, in the synthesis of the isocyanate-terminated prepolymer, relative to the number of active hydrogen groups (such as a hydroxyl group) of an active hydrogen group-containing compound. Further, in that case, the NCO wt % is preferably adjusted to 4 to 30 wt %, more preferably 4 to 26 wt %, in the synthesis of an isocyanate-terminated prepolymer.

In the case of using a mesogenic diol when Y is —CH=N—, the number of isocyanate groups of the isocyanate component is preferably 2 to 10, more preferably 2 to 7, in the synthesis of the isocyanate-terminated prepolymer, relative to the number of active hydrogen groups (such as a hydroxyl group) of an active hydrogen group-containing compound. Further, in that case, the NCO wt % is preferably adjusted to 4 to 30 wt %, more preferably 4 to 25 wt %, in the synthesis of an isocyanate-terminated prepolymer.

The liquid crystalline polyurethane elastomer of the present invention can be prepared using known urethane formation techniques such as a melting method or a solution method. A catalyst that promotes the known polyurethane reaction, such as tertiary amines and the like, may be used.

In the case of using a mesogenic diol when Y is a single bond, —N=N—, or —CO—, the liquid crystalline polyurethane elastomer has a molecular weight between crosslinks of preferably 1500 to 20000, more preferably 2000 to 18000. Also, in that case, the glass transition temperature (Tg) of the liquid crystalline polyurethane elastomer is preferably −50 to 30° C., more preferably −50 to 25° C. Further, in that case, the (liquid crystal phase)-to-(isotropic phase) transition temperature (Ti) is preferably 35 to 85° C., more preferably 35 to 75° C.

In the case of using a mesogenic diol when Y is —CO—O—, the liquid crystalline polyurethane elastomer has a molecular weight between crosslinks of preferably 2500 to 25000, more preferably 3000 to 25000. Also, in that case, the glass transition temperature (Tg) of the liquid crystalline polyurethane elastomer is preferably −60° C. or higher and less than 30° C., more preferably −60 to 25° C., still more preferably −30 to 20° C. Further, in that case, the (liquid crystal phase)-to-(isotropic phase) transition temperature (Ti) is preferably 30 to 130° C., more preferably 30 to 115° C., still more preferably 30 to 105° C.

In the case of using a mesogenic diol when Y is —CH=N—, the liquid crystalline polyurethane elastomer has a molecular weight between crosslinks of preferably 1500 to 25000, more preferably 2000 to 22000, still more preferably 3000 to 20000. Also, in that case, the glass transition temperature (Tg) of the liquid crystalline polyurethane elastomer is preferably −50 to 30° C., more preferably −50 to 25° C., still more preferably −45 to 20° C. Further, in that case, the (liquid crystal phase)-to-(isotropic phase) transition temperature (Ti) is preferably 35 to 120° C., more preferably 35 to 100° C.

Further, the liquid crystalline polyurethane elastomers of the present invention are those having rubbery elasticity when a liquid crystal is developed, and the storage elastic modulus when a liquid crystal is developed is preferably from 0.01 to 500 MPa, more preferably 0.05 to 100 MPa.

EXAMPLES

Description will be given of the invention with examples, while the invention is not limited to description in the examples.

[Measurement and Evaluation Method]

(Calculation of Content of Mesogenic Diol)

The content of the mesogenic diol in the polyurethane elastomer was calculated by the following equation.

Content of mesogenic diol (wt %)={(Weight of mesogenic diol)/(Weight of total material components of polyurethane elastomer)}×100

(Calculation of Molecular Weight Between Crosslinks)

The molecular weight between crosslinks of the polyurethane elastomer was calculated by the following equation.

Molecular weight between crosslinks=(Weight of total material components of polyurethane elastomer)/($A \times B$)

$A$=(Hydroxyl value of high-molecular-weight polyol having three or more hydroxyl groups)/56.1

$B$=(Weight of high-molecular-weight polyol having three or more hydroxyl groups)/(Number of hydroxyl groups of high-molecular-weight polyol×1000)

(Measurement of Glass Transition Temperature (Tg) of Polyurethane Elastomer, Melting Point (Tm) of Mesogenic Unit, and (Liquid Crystal Phase)-to-(Isotropic Phase) Transition Temperature (Ti))

The Tg, Tm, and Ti were measured under the condition of 20° C./min using a differential scanning calorimeter DSC (manufactured by Hitachi High-Tech Science Corp., trade name: X-DSC 7000).

(Evaluation of Liquid Crystallinity)

The presence or absence of liquid crystal development of the polyurethane elastomer was evaluated by using a polarization microscope (manufactured by Nikon Corporation, trade name: LV-100POL) and a differential scanning calorimeter DSC (manufactured by Hitachi High-Tech Science Corp., trade name: X-DSC 7000) under the condition of 20° C./min.

(Discriminating Method of Melting Point (Tm) of Mesogenic Unit and (Liquid Crystal Phase)-to-(Isotropic Phase) Transition Temperature (Ti))

Discrimination of melting point (Tm) of a mesogenic unit and (liquid crystal phase)-to-(isotropic phase) transition temperature (Ti) was performed under the conditions of 2°/min and 20° C./min by using a polarization microscope (manufactured by Nikon Corporation, trade name: LV-100POL) and an X-ray diffraction apparatus (Rigaku Corporation, trade name: RINT-Ultima III).

(Measurement of Storage Elastic Modulus (E') when Liquid Crystal is Developed)

The storage elastic modulus of the polyurethane elastomer when a liquid crystal is developed therein was measured under the conditions of 2° C./min, strain 2%, and 10 Hz using a VES (manufactured by Ueshima Seisakusho Co., Ltd., trade name: fully automatic viscoelasticity analyzer VR-7110).

EXAMPLE IN CASE OF USING MESOGENIC DIOL WHEN Y IS A SINGLE BOND

Production Example 1

(Synthesis of Mesogenic Diol)

After ethanol (manufactured by Nacalai Tesque Inc.) 1.5 L was placed in a reaction vessel, sodium hydroxide (manufactured by Nacalai Tesque Inc.) 120 g was added thereto and the mixture was dissolved. Thereafter, 4,4'-biphenol (manufactured by Tokyo Chemical Industry Co., Ltd.) 140 g was added thereto and the mixture was heated under reflux for 30 minutes. Then, 6-chloro-1-hexanol (manufactured by Tokyo Chemical Industry Co., Ltd.) 451 g was dropwise added thereto, and the reaction solution was stirred at 90° C. for 12 hours. After that, the reaction solution was subjected to suction filtration and the resulting precipitates were washed with water, recrystallized from a mixed solvent of DMF (manufactured by Mitsubishi Gas Chemical Company, Inc.)/ethanol (1/3), and further recrystallized from 1-butanol (manufactured by Nacalai Tesque Inc.) to obtain 4,4'-bis(6-hydroxyhexyloxy)biphenyl 170 g.

Production Example 2

(Synthesis of Isocyanate-Terminated Prepolymer A)

Polypropylene glycol (manufactured by Asahi Glass Co., Ltd., trade name: EXCENOL 1030, number of hydroxyl groups: 3, number average molecular weight: 1000) 100 g and 2,4-tolylene diisocyanate (Nippon Polyurethane Industry Co., Ltd., trade name: T-100) 74.4 g were placed in a reaction vessel, stirred under a nitrogen stream, and reacted to obtain an isocyanate-terminated prepolymer A (NCO index: 3, isocyanate content: 13.7 wt %).

Production Example 3

(Synthesis of Isocyanate-Terminated Prepolymer B)

Polypropylene glycol (manufactured by Asahi Glass Co., Ltd., trade name: EXCENOL 1030, number of hydroxyl groups: 3, number average molecular weight: 1000) 100 g and 2,4-tolylene diisocyanate (Nippon Polyurethane Industry Co., Ltd., trade name: T-100) 49.6 g were placed in a reaction vessel, stirred under a nitrogen stream, and reacted to obtain an isocyanate-terminated prepolymer B (NCO index: 2, isocyanate content: 8.01 wt %).

Production Example 4

(Synthesis of Isocyanate-Terminated Prepolymer C)

Polypropylene glycol (manufactured by Asahi Glass Co., Ltd., trade name: EXCENOL 903, number of hydroxyl groups: 3, number average molecular weight: 1500) 100 g and 2,4-tolylene diisocyanate (Nippon Polyurethane Industry Co., Ltd., trade name: T-100) 53.0 g were placed in a reaction vessel, stirred under a nitrogen stream, and reacted to obtain an isocyanate-terminated prepolymer C (NCO index: 3, isocyanate content: 11.2 wt %).

Production Example 5

(Synthesis of Isocyanate-Terminated Prepolymer D)

Polypropylene glycol (manufactured by Asahi Glass Co., Ltd., trade name: EXCENOL 3030, number of hydroxyl groups: 3, number average molecular weight: 1000) 100 g and 2,4-tolylene diisocyanate (Nippon Polyurethane Industry Co., Ltd., trade name: T-100) 26.1 g were placed in a reaction vessel, stirred under a nitrogen stream, and reacted to obtain an isocyanate-terminated prepolymer D (NCO index: 3, isocyanate content: 6.7 wt %).

Production Example 6

(Synthesis of Isocyanate-Terminated Prepolymer E)

Polypropylene glycol (manufactured by Asahi Glass Co., Ltd., trade name: EXCENOL 2020, number of hydroxyl groups: 2, number average molecular weight: 2000) 100 g and 2,4-tolylene diisocyanate (Nippon Polyurethane Industry Co., Ltd., trade name: T-100) 26.1 g were placed in a reaction vessel, stirred under a nitrogen stream, and reacted to obtain an isocyanate-terminated prepolymer E (NCO index: 3, isocyanate content: 6.7 wt %).

Production Example 7

(Synthesis of Isocyanate-Terminated Prepolymer F)

Polypropylene glycol (manufactured by Asahi Glass Co., Ltd., trade name: EXCENOL 850, number of hydroxyl groups: 3, number average molecular weight: 7000) 100 g and 2,4-tolylene diisocyanate (Nippon Polyurethane Industry Co., Ltd., trade name: T-100) 52.5 g were placed in a reaction vessel, stirred under a nitrogen stream, and reacted to obtain an isocyanate-terminated prepolymer F (NCO index: 3, isocyanate content: 3.3 wt %).

Production Example 8

(Synthesis of Isocyanate-Terminated Prepolymer G)

Polypropylene glycol (manufactured by Asahi Glass Co., Ltd., trade name: EXCENOL 430, number of hydroxyl groups: 3, number average molecular weight: 400) 100 g and 2,4-tolylene diisocyanate (Nippon Polyurethane Industry Co., Ltd., trade name: T-100) 260 g were placed in a reaction vessel, stirred under a nitrogen stream, and reacted to obtain an isocyanate-terminated prepolymer G (NCO index: 3, isocyanate content: 16.14 wt %).

Production Example 9

(Synthesis of Isocyanate-Terminated Prepolymer H)

Polypropylene glycol (manufactured by Asahi Glass Co., Ltd., trade name: EXCENOL 430, number of hydroxyl groups: 3, number average molecular weight: 400) 100 g and 2,4-tolylene diisocyanate (Nippon Polyurethane Industry Co., Ltd., trade name: T-100) 174 g were placed in a reaction vessel, stirred under a nitrogen stream, and reacted to obtain an isocyanate-terminated prepolymer H (NCO index: 2, isocyanate content: 23.84 wt %).

Production Example 10

(Synthesis of Isocyanate-Terminated Prepolymer I)

Polypropylene glycol (manufactured by Asahi Glass Co., Ltd., trade name: EXCENOL 720, number of hydroxyl groups: 2, number average molecular weight: 700) 100 g and 2,4-tolylene diisocyanate (Nippon Polyurethane Industry Co., Ltd., trade name: T-100) 49.6 g were placed in a reaction vessel, stirred under a nitrogen stream, and reacted to obtain an isocyanate-terminated prepolymer I (NCO index: 2, isocyanate content: 8.01 wt %).

Example 1

(Preparation of Polyurethane Elastomer)

Dehydrated DMF (manufactured by Wako Pure Chemical Industries, Ltd.) 60 ml was placed in a reaction vessel, to which was added 4,4'-bis(6-hydroxyhexyloxy)biphenyl 10 g, and the mixture was dissolved. Thereafter, isocyanate-terminated prepolymer A 18.85 g prepared in Production Example 2 and a catalyst (manufactured by Tosoh Corporation, trade name: TEDA-L33) 0.1 g were added to the reaction vessel, followed by stirring at 80° C. for 30 minutes. Then, defoamed reaction solution was poured into a mold which had been previously heated to 80° C., and cured at 80° C. to prepare a cured sheet. DMF in the cured sheet obtained was removed with a vacuum dryer to produce a polyurethane elastomer sheet.

Examples 2 to 5 and Comparative Examples 1 to 5

A polyurethane elastomer sheet was produced in the same manner as in Example 1, except that the starting materials and the blending amounts shown in Table 1 are employed. The T-9 in Table 1 is a catalyst manufactured by Toei Chemical Industries, Co., Ltd.

TABLE 1

| | Prepolymer (g) | Mesogenic diol (g) | Mesogenic diol content (wt %) | Catalyst (g) | Molecular weight between crosslinks | Tg (° C.) | Tm (° C.) | Ti (° C.) | Liquid crystallinity | Storage elastic modulus (MPa) when a liquid crystal is developed |
|---|---|---|---|---|---|---|---|---|---|---|
| Example 1 | A (15.90) | 10 | 39 | TEDA-L33 (0.1) | 2988 | 10 | — | 60 | Present | 1~100 |
| Example 2 | B (27.27) | 10 | 27 | TEDA-L33 (0.1) | 2150 | 20 | — | 84 | Present | 1~100 |
| Example 3 | C (19.80) | 10 | 34 | TEDA-L33 (0.1) | 3420 | −3 | — | 63 | Present | 0.1~100 |
| Example 4 | D (8.93), E(26.8) | 10 | 18 | T-9 (0.1) | 14517 | −24 | — | 48 | Present | 0.01~1 |
| Example 5 | D (7.15), E(28.58) | 10 | 18 | T-9 (0.1) | 17744 | −43 | — | 36 | Present | 0.01~1 |
| Comparative Example 1 | F (92.71) | 10 | 9.7 | T-9 (0.1) | 8638 | −51 | — | — | Absent | — |
| Comparative Example 2 | G (9.15) | 10 | 52.2 | — | 2394 | 66 | 77 | 102 | Present | 750~1000 |
| Comparative Example 3 | H (13.53) | 10 | 43 | — | 1429 | — | — | — | Absent | — |
| Comparative Example 4 | D (3.57), E(32.2) | 10 | 18 | T-9 (0.1) | 33874 | — | — | — | Absent | — |
| Comparative Example 5 | I (27.27) | 10 | 27 | T-9 (0.1) | — | −4 | 115 | 121 | Present | — |

The polyurethane elastomers of Examples 1 to 5 were those exhibiting a liquid crystallinity, showing a low liquid crystal-developing temperature, and having rubbery elasticity when a liquid crystal is developed therein. The polyurethane elastomer of Comparative Example 1 did not develop a liquid crystallinity because of a small content of the mesogenic diol. Since the content of the mesogenic diol in the polyurethane elastomer of Comparative Example 2 is too much, the melting point (Tm) of a mesogenic unit exists at a temperature between the Tg and the Ti, resulting in failure to develop the liquid crystallinity at the low temperature. Since the polyurethane elastomer of Comparative Example 3 has a too small molecular weight between crosslinks, it did not have a rubbery elasticity. Since the polyurethane elastomer of Comparative Example 4 has a too large molecular weight between crosslinks, it did not cure. Since the polyurethane elastomer of Comparative Example 5 has no crosslinking site, it could not inhibit the crystallinity of a mesogenic unit and the melting point (Tm) of a mesogenic unit exists, causing no development of a liquid crystallinity at room temperature. Moreover, such polyurethane elastomers were those having an increased fluidity when a liquid crystal is developed therein and having no rubbery elasticity.

EXAMPLE IN CASE OF USING MESOGENIC DIOL WHEN Y IS —CO—O—

Production Example 1

(Synthesis of Mesogenic Diol)
To a reaction vessel were added p-hydroxybenzoic acid (manufactured by Nacalai Tesque Inc.) 103.5 g, hydroquinone (manufactured by Nacalai Tesque Inc.) 82.5 g, boric acid (manufactured by Nacalai Tesque Inc.) 1.5 g, and xylene (manufactured by Nacalai Tesque Inc.) 450 ml, and the mixture was stirred and concentrated sulfuric acid (manufactured by Nacalai Tesque Inc.) 2.1 g was dropwise added thereto. Then, the mixture was heated under reflux for 5 hours using a Dean-Stark tube. Thereafter, the reaction product was subjected to suction filtration to obtain a solid material. The obtained solid was neutralized with 1% aqueous sodium hydrogen carbonate solution (250 ml). Thereafter, the solid was collected by filtration, washed with water, and dried in vacuo. Then, the dried product was recrystallized from a mixed solvent of acetone and water to obtain 4-hydroxyphenyl p-hydroxybenzoate (105.77 g) as a white powder.

Subsequently, 4-hydroxyphenyl p-hydroxybenzoate (90 g), potassium carbonate (162 g), and DMF (manufactured by Mitsubishi Gas Chemical Company, Inc.) 700 ml were placed in a reaction vessel, and the mixture was heated to 60° C. Thereafter, 6-chloro-1-hexanol (manufactured by Tokyo Chemical Industry Co., Ltd.) 160 g was dropwise added to the reaction vessel, and the mixture was heated under reflux at 90° C. for 23 hours. After addition of 1 L of water to the reaction vessel, concentrated sulfuric acid (manufactured by Nacalai Tesque Inc.) was further added thereto until the mixture became acidic, and the solvent was distilled under reduced pressure. The resulting solid was purified by wet column chromatography (SiO$_2$, ethyl acetate/hexane) and recrystallized from ethyl acetate to obtain the following compound A (6 g) as a white solid.

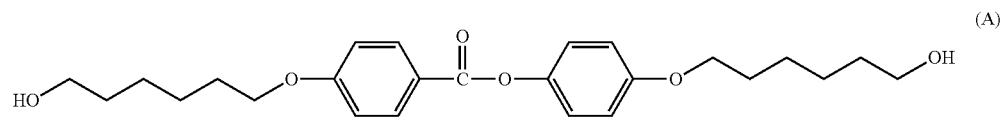 [SMILES: O=C(Oc1ccc(OCCCCCCO)cc1)c1ccc(OCCCCCCO)cc1]

(A)

Production Example 2

(Synthesis of Isocyanate-Terminated Prepolymer B)

Polypropylene glycol (manufactured by Asahi Glass Co., Ltd., trade name: EXCENOL 903, number of hydroxyl groups: 3, number average molecular weight: 1500) and 2,4-tolylene diisocyanate (Nippon Polyurethane Industry Co., Ltd., trade name: T-100) were placed in a reaction vessel, stirred under a nitrogen stream, and reacted to obtain an isocyanate-terminated prepolymer B (NCO index: 3, isocyanate content: 11 wt %).

Production Example 3

(Synthesis of Isocyanate-Terminated Prepolymer C)

Polypropylene glycol (manufactured by Asahi Glass Co., Ltd., trade name: EXCENOL 903, number of hydroxyl groups: 3, number average molecular weight: 1500) and 2,4-tolylene diisocyanate (Nippon Polyurethane Industry Co., Ltd., trade name: T-100) were placed in a reaction vessel, stirred under a nitrogen stream, and reacted to obtain an isocyanate-terminated prepolymer C (NCO index: 6.6, isocyanate content: 21.9 wt %).

Production Example 4

(Synthesis of Isocyanate-Terminated Prepolymer D)

Polypropylene glycol (manufactured by Asahi Glass Co., Ltd., trade name: EXCENOL 1020, number of hydroxyl groups: 2, number average molecular weight: 1000) and 2,4-tolylene diisocyanate (Nippon Polyurethane Industry Co., Ltd., trade name: T-100) were placed in a reaction vessel, stirred under a nitrogen stream, and reacted to obtain an isocyanate-terminated prepolymer D (NCO index: 6.6, isocyanate content: 21.9 wt %).

Production Example 5

(Synthesis of Isocyanate-Terminated Prepolymer E)

Polypropylene glycol (manufactured by Asahi Glass Co., Ltd., trade name: EXCENOL 1030, number of hydroxyl groups: 3, number average molecular weight: 1000) and 2,4-tolylene diisocyanate (Nippon Polyurethane Industry Co., Ltd., trade name: T-100) were placed in a reaction vessel, stirred under a nitrogen stream, and reacted to obtain an isocyanate-terminated prepolymer E (NCO index: 6.6, isocyanate content: 25.4 wt %).

Production Example 6

(Synthesis of Isocyanate-Terminated Prepolymer F)

Polypropylene glycol (manufactured by Asahi Glass Co., Ltd., trade name: EXCENOL 720, number of hydroxyl groups: 2, number average molecular weight: 700) and 2,4-tolylene diisocyanate (Nippon Polyurethane Industry Co., Ltd., trade name: T-100) were placed in a reaction vessel, stirred under a nitrogen stream, and reacted to obtain an isocyanate-terminated prepolymer F (NCO index: 6.6, isocyanate content: 25.4 wt %).

Production Example 7

(Synthesis of Isocyanate-Terminated Prepolymer G)

Polypropylene glycol (manufactured by Asahi Glass Co., Ltd., trade name: EXCENOL 3030, number of hydroxyl groups: 3, number average molecular weight: 3000) and 2,4-tolylene diisocyanate (Nippon Polyurethane Industry Co., Ltd., trade name: T-100) were placed in a reaction vessel, stirred under a nitrogen stream, and reacted to obtain an isocyanate-terminated prepolymer G (NCO index: 5, isocyanate content: 11.7 wt %).

Production Example 8

(Synthesis of Isocyanate-Terminated Prepolymer H)

Polypropylene glycol (manufactured by Asahi Glass Co., Ltd., trade name: EXCENOL 850, number of hydroxyl groups: 3, number average molecular weight: 7000) and 2,4-tolylene diisocyanate (Nippon Polyurethane Industry Co., Ltd., trade name: T-100) were placed in a reaction vessel, stirred under a nitrogen stream, and reacted to obtain an isocyanate-terminated prepolymer H (NCO index: 5, isocyanate content: 6.1 wt %).

Production Example 9

(Synthesis of Isocyanate-Terminated Prepolymer I)

Polypropylene glycol (manufactured by Asahi Glass Co., Ltd., trade name: EXCENOL 430, number of hydroxyl groups: 3, number average molecular weight: 400) and 2,4-tolylene diisocyanate (Nippon Polyurethane Industry Co., Ltd., trade name: T-100) were placed in a reaction vessel, stirred under a nitrogen stream, and reacted to obtain an isocyanate-terminated prepolymer I (NCO index: 2.5, isocyanate content: 17.5 wt %).

Example 1

(Preparation of Polyurethane Elastomer)

Dehydrated DMF (manufactured by Wako Pure Chemical Industries, Ltd.) 3 ml was placed in a reaction vessel, and to this was added the compound A (0.5 g) prepared in Production Example 1. After dissolving the mixture, the isocyanate-terminated prepolymer B (0.88 g) prepared in Production Example 2 was added to the reaction vessel, and the mixture was stirred at 80° C. for 30 minutes. Then, defoamed reaction solution was poured into a mold which had been previously heated to 80° C., and cured at 80° C. to prepare a cured sheet. DMF in the cured sheet obtained was removed with a vacuum dryer to produce a polyurethane elastomer sheet.

Examples 2 to 4 and Comparative Examples 1 to 3

A polyurethane elastomer sheet was produced in the same manner as in Example 1, except that the starting materials and the blending amounts shown in Table 2 are employed.

TABLE 2

|  | Prepolymer (g) | Compund A: mesogenic diol (g) | Compound A: mesogenic diol content (wt %) | Molecular weight between crosslinks | Tg (° C.) | Tm (° C.) | Ti (° C.) | Liquid crystallinity | Storage elastic modulus (MPa) when a liquid crystal is developed |
|---|---|---|---|---|---|---|---|---|---|
| Example 1 | B (0.88) | 0.5 | 36 | 3559 | −8.4 | — | 34 | Present | 1~100 |
| Example 2 | C (0.13), D (0.31) | 0.5 | 53 | 22876 | −2.1 | — | 103 | Present | 0.01~1 |
| Example 3 | E(0.19), F (0.19) | 0.5 | 56 | 12856 | 12 | — | 64 | Present | 0.01~1 |
| Example 4 | G (0.83) | 0.5 | 37 | 6379 | −24 | — | 51 | Present | 0.1~10 |
| Comparative Example 1 | H (1.21) | 0.5 | 29 | 11756 | −32 | — | — | Absent | — |
| Comparative Example 2 | C (0.11), D(0.33) | 0.5 | 53 | 27451 | — | — | — | Absent | — |
| Comparative Example 3 | I (0.56) | 0.5 | 47 | 2188 | — | — | — | Present | — |

The polyurethane elastomers of Examples 1 to 4 were those exhibiting a liquid crystallinity, showing a low liquid crystal-developing temperature, and having rubbery elasticity when a liquid crystal is developed therein. The polyurethane elastomer of Comparative Example 1 did not develop a liquid crystallinity because of a small content of the mesogenic diol. The polyurethane elastomer of Comparative Example 2 did not cure because it had a too large molecular weight between crosslinks. The polyurethane elastomer of Comparative Example 3 did not develop a liquid crystal because it had a too small molecular weight between crosslinks.

EXAMPLE IN CASE OF USING MESOGENIC DIOL WHEN Y IS —CH=N—

Production Example 1

(Synthesis of Mesogenic Diol)
4-Aminophenol (manufactured by Tokyo Chemical Industry Co., Ltd.) 223 g, 4-hydroxybenzaldehyde (manufactured by Tokyo Chemical Industry Co., Ltd.) 250 g, acetic acid 1.8 g, and ethanol (manufactured by Nacalai Tesque Inc.) 800 ml were placed in a reaction vessel, and the mixture was heated under reflux for 3 hours. After cooling the reaction mixture to room temperature, water was added to the reaction vessel and the mixture was subjected to suction filtration to obtain a solid. The obtained solid was dried in vacuo and recrystallized from ethanol to obtain 4,4'-dihydroxybenzylideneaniline (335 g) as a white solid.

Then, 4,4'-dihydroxybenzylideneaniline (175 g), 6-chloro-1-hexanol (manufactured by Tokyo Chemical Industry Co., Ltd.) 335 g, potassium carbonate (manufactured by Nacalai Tesque Inc.) 340 g, and DMF (manufactured by Mitsubishi Gas Chemical Company, Inc.) 1.5 L were placed in the reaction vessel, and the mixture was heated under reflux for 20 hours. After cooling the mixture to room temperature, hydrochloric acid was added to the reaction vessel until the reaction solution became acidic. Thereafter, water was added to the reaction vessel, and the mixture was subjected to suction filtration to obtain a solid.

The resulting solid was dried in vacuo and recrystallized from water/ethanol (1/3) to obtain the following compound A (241 g) as a white solid.

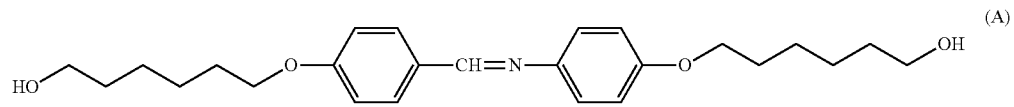 [SMILES: OCCCCCCOc1ccc(C=Nc2ccc(OCCCCCCO)cc2)cc1]

(A)

Production Example 2

(Synthesis of Isocyanate-Terminated Prepolymer B)
Polypropylene glycol (manufactured by Asahi Glass Co., Ltd., trade name: EXCENOL 903, number of hydroxyl groups: 3, number average molecular weight: 1500) and 2,4-tolylene diisocyanate (Nippon Polyurethane Industry Co., Ltd., trade name: T-100) were placed in a reaction vessel, stirred under a nitrogen stream, and reacted to obtain an isocyanate-terminated prepolymer B (NCO index: 6.6, isocyanate content: 21.9 wt %).

Production Example 3

(Synthesis of Isocyanate-Terminated Prepolymer C)
Polypropylene glycol (manufactured by Asahi Glass Co., Ltd., trade name: EXCENOL 1030, number of hydroxyl groups: 3, number average molecular weight: 1000) and 2,4-tolylene diisocyanate (Nippon Polyurethane Industry Co., Ltd., trade name: T-100) were placed in a reaction vessel, stirred under a nitrogen stream, and reacted to obtain an isocyanate-terminated prepolymer C (NCO index: 3, isocyanate content: 13.7 wt %).

Production Example 4

(Synthesis of Isocyanate-Terminated Prepolymer D)
Polypropylene glycol (manufactured by Asahi Glass Co., Ltd., trade name: EXCENOL 3030, number of hydroxyl groups: 3, number average molecular weight: 3000) and 2,4-tolylene diisocyanate (Nippon Polyurethane Industry Co., Ltd., trade name: T-100) were placed in a reaction vessel, stirred under a nitrogen stream, and reacted to obtain an isocyanate-terminated prepolymer D (NCO index: 2.5, isocyanate content: 5.18 wt %).

Production Example 5

(Synthesis of Isocyanate-Terminated Prepolymer E)

Polypropylene glycol (manufactured by Asahi Glass Co., Ltd., trade name: EXCENOL 2020, number of hydroxyl groups: 2, number average molecular weight: 2000) and 2,4-tolylene diisocyanate (Nippon Polyurethane Industry Co., Ltd., trade name: T-100) were placed in a reaction vessel, stirred under a nitrogen stream, and reacted to obtain an isocyanate-terminated prepolymer E (NCO index: 2.5, isocyanate content: 5.18 wt %).

Production Example 6

(Synthesis of Isocyanate-Terminated Prepolymer F)

Polypropylene glycol (manufactured by Asahi Glass Co., Ltd., trade name: EXCENOL 850, number of hydroxyl groups: 3, number average molecular weight: 7000) and 2,4-tolylene diisocyanate (Nippon Polyurethane Industry Co., Ltd., trade name: T-100) were placed in a reaction vessel, stirred under a nitrogen stream, and reacted to obtain an isocyanate-terminated prepolymer F (NCO index: 3, isocyanate content: 3.23 wt %).

Production Example 7

(Synthesis of Isocyanate-Terminated Prepolymer G)

Polypropylene glycol (manufactured by Asahi Glass Co., Ltd., trade name: EXCENOL 1020, number of hydroxyl groups: 2, number average molecular weight: 1000) and 2,4-tolylene diisocyanate (Nippon Polyurethane Industry Co., Ltd., trade name: T-100) were placed in a reaction vessel, stirred under a nitrogen stream, and reacted to obtain an isocyanate-terminated prepolymer G (NCO index: 6.6, isocyanate content: 22.0 wt %).

Production Example 8

(Synthesis of Isocyanate-Terminated Prepolymer H)

Polypropylene glycol (manufactured by Asahi Glass Co., Ltd., trade name: EXCENOL 430, number of hydroxyl groups: 3, number average molecular weight: 400) and 2,4-tolylene diisocyanate (Nippon Polyurethane Industry Co., Ltd., trade name: T-100) were placed in a reaction vessel, stirred under a nitrogen stream, and reacted to obtain an isocyanate-terminated prepolymer H (NCO index: 2, isocyanate content: 15.3 wt %).

Production Example 9

(Synthesis of Isocyanate-Terminated Prepolymer I)

Polypropylene glycol (manufactured by Asahi Glass Co., Ltd., trade name: EXCENOL 720, number of hydroxyl groups: 2, number average molecular weight: 700) and 2,4-tolylene diisocyanate (Nippon Polyurethane Industry Co., Ltd., trade name: T-100) were placed in a reaction vessel, stirred under a nitrogen stream, and reacted to obtain an isocyanate-terminated prepolymer I (NCO index: 2, isocyanate content: 8.01 wt %).

Example 1

(Preparation of Polyurethane Elastomer)

Dehydrated DMF (manufactured by Wako Pure Chemical Industries, Ltd.) 3 ml was placed in a reaction vessel, and to this was added the compound A (0.5 g) prepared in Production Example 1. After dissolving the mixture, the isocyanate-terminated prepolymer B (0.46 g) prepared in Production Example 2 was added to the reaction vessel, and the mixture was stirred at 80° C. for 30 minutes. Then, defoamed reaction solution was poured into a mold which had been previously heated to 80° C., and cured at 80° C. to prepare a cured sheet. DMF in the cured sheet obtained was removed with a vacuum dryer to produce a polyurethane elastomer sheet.

Examples 2 and 3 and Comparative Examples 1 to 4

A polyurethane elastomer sheet was produced in the same manner as in Example 1, except that the starting materials and the blending amounts shown in Table 3 are employed.

TABLE 3

| | Prepolymer (g) | Compund A: mesogenic diol (g) | Compound A: mesogenic diol content (wt %) | Molecular weight between crosslinks | Tg (° C.) | Tm (° C.) | Ti (° C.) | Liquid crystallinity | Storage elastic modulus (MPa) when a liquid crystal is developed |
|---|---|---|---|---|---|---|---|---|---|
| Example 1 | B (0.46) | 0.5 | 52 | 6713 | 16 | — | 56 | Present | 1~100 |
| Example 2 | C (0.74) | 0.5 | 40 | 3076 | −1 | — | 92 | Present | 1~100 |
| Example 3 | D(1.47), E(0.49) | 0.5 | 20 | 18335 | −43 | — | 39 | Present | 0.01~1 |
| Comparative Example 1 | F (3.14) | 0.5 | 14 | 9032 | −53 | — | — | Absent | — |
| Comparative Example 2 | B (0.12), G(0.35) | 0.5 | 52 | 26775 | — | — | — | Absent | — |
| Comparative Example 3 | H (0.66) | 0.5 | 43 | 1447 | 47 | — | 64 | Present | 800~1000 |
| Comparative Example 4 | I (1.22) | 0.5 | 29 | — | −7 | 82 | 103 | Present | — |

The polyurethane elastomers of Examples 1 to 3 were those exhibiting a liquid crystallinity, showing a low liquid crystal-developing temperature, and having rubbery elasticity when a liquid crystal is developed therein. The polyurethane elastomer of Comparative Example 1 did not develop a liquid crystallinity because of a small content of the mesogenic diol. The polyurethane elastomer of Comparative Example 2 did not cure because it had a too large molecular weight between crosslinks. Since the polyurethane elastomer of Comparative Example 3 has a too small molecular weight between crosslinks, it did not have a rubbery elasticity. Since the polyurethane elastomer of Comparative Example 4 has no crosslinking site, it could not inhibit the crystallinity of a mesogenic unit and the melting point (Tm) of a mesogenic unit exists, causing no development of a liquid crystallinity at room temperature. Moreover, such polyurethane elastomers were those having an increased fluidity when a liquid crystal is developed therein and having no rubbery elasticity.

INDUSTRIAL APPLICABILITY

Since the liquid crystalline polyurethane elastomer of the present invention exhibits a characteristic response behavior such that said elastomer extends in the orientation direction by an increase in the degree of the liquid crystal orientation due to a tensile stress applied, and shrinks by a decrease in the degree of the liquid crystal orientation due to heating applied thereto, it is possible to apply the liquid crystalline polyurethane elastomer to various fields such as actuators and the like.

The invention claimed is:

1. A liquid crystalline polyurethane elastomer, which is produced by reacting at least an isocyanate component, a high-molecular-weight polyol and a mesogenic diol represented by general formula (1) with one another, and has a crosslinking site that is introduced by a tri-functional or higher isocyanate in the isocyanate component and/or the high-molecular-weight polyol having three or more hydroxy groups, wherein the melting point of a mesogenic unit does not exist in a temperature range lying between the glass transition temperature (Tg) and the (liquid crystal phase)-to-(isotropic phase) transition temperature (Ti) of the polyurethane elastomer, and a liquid crystal is developed at a temperature between the Tg and the Ti, and
   wherein the high-molecular-weight polyol has a number average molecular weight of 400 or more and less than 7000,

[Formula]

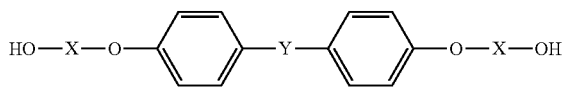

(1)

wherein in the formula, X represents an alkylene group having 3 to 20 carbon atoms; and Y represents a single bond, —N═N—, —CO—, —CO—O— or —CH═N—.

2. The liquid crystalline polyurethane elastomer according to claim 1, wherein the mesogenic diol when Y represents a single bond, —N═N— or —CO— is used; the glass transition temperature (Tg) is −50 to 30° C.; and the (liquid crystal phase)-to-(isotropic phase)transition temperature (Ti) is 35 to 85° C.

3. The liquid crystalline polyurethane elastomer according to claim 2, wherein the mesogenic diol when Y represents a single bond, —N═N— or —CO— is used; the blending amount of the mesogenic diol is 10 to 50 wt % based on the total material components; and the molecular weight between crosslinks is 1500 to 20000.

4. The liquid crystalline polyurethane elastomer according to claim 1, wherein the mesogenic diol when Y represents a single bond, —N═N— or —CO— is used; the blending amount of the mesogenic diol is 10 to 50 wt % based on the total material components; and the molecular weight between crosslinks is 1500 to 20000.

5. The liquid crystalline polyurethane elastomer according to claim 1, wherein the mesogenic diol when Y represents —CO—O— is used; the glass transition temperature (Tg) is −60° C. or higher and less than 30° C.; and the (liquid crystal phase)-to-(isotropic phase) transition temperature (Ti) is 30 to 130° C.

6. The liquid crystalline polyurethane elastomer according to claim 5, wherein the mesogenic diol when Y represents —CO—O— is used; the blending amount of the mesogenic diol is 30 to 80 wt % based on the total material components; and the molecular weight between crosslinks is 2500 to 25000.

7. The liquid crystalline polyurethane elastomer according to claim 1, wherein the mesogenic diol when Y represents —CO—O— is used; the blending amount of the mesogenic diol is 30 to 80 wt % based on the total material components; and the molecular weight between crosslinks is 2500 to 25000.

8. The liquid crystalline polyurethane elastomer according to claim 1, wherein the mesogenic diol when Y represents —CH═N— is used; the glass transition temperature (Tg) is −50 to 30° C.; and the (liquid crystal phase)-to-(isotropic phase) transition temperature (Ti) is 35 to 120° C.

9. The liquid crystalline polyurethane elastomer according to claim 8, wherein the mesogenic diol when Y represents —CH═N— is used; the blending amount of the mesogenic diol is 15 to 70 wt % based on the total material components; and the molecular weight between crosslinks is 1500 to 25000.

10. The liquid crystalline polyurethane elastomer according to claim 1, wherein the mesogenic diol when Y represents —CH═N— is used; the blending amount of the mesogenic diol is 15 to 70 wt % based on the total material components; and the molecular weight between crosslinks is 1500 to 25000.

11. A method for producing a liquid crystalline polyurethane elastomer of claim 1, which method comprises reacting at least an isocyanate component and a high-molecular-weight polyol to synthesize an isocyanate-terminated prepolymer and reacting the resulting isocyanate-terminated prepolymer with a mesogenic diol,
   wherein the high-molecular-weight polyol has a number average molecular weight of 400 or more and less than 7000.

* * * * *